United States Patent [19]
Poulin et al.

[11] Patent Number: 5,451,186
[45] Date of Patent: Sep. 19, 1995

[54] AXIALLY FIXED TRANSMISSION JOINT

[75] Inventors: Bernard Poulin, Conflans Ste Honorine; Michel Margerie, Vetheuil, both of France

[73] Assignee: GKN Glaenzer Spicer, Poissy, France

[21] Appl. No.: 245,529

[22] Filed: May 18, 1994

Related U.S. Application Data

[63] Continuation of Ser. No. 806,153, Dec. 12, 1991, abandoned.

[30] Foreign Application Priority Data

Dec. 28, 1990 [FR] France .................. 90 16498

[51] Int. Cl.$^6$ ........................................ F16D 3/84
[52] U.S. Cl. ............................ 464/175; 464/905
[58] Field of Search .......... 464/111, 905, 901, 175; 277/212 FB

[56] References Cited

U.S. PATENT DOCUMENTS

| | | | |
|---|---|---|---|
| 3,745,789 | 7/1973 | Orain | 464/905 |
| 3,757,534 | 9/1973 | Orain | 464/111 |
| 4,318,282 | 3/1982 | Orain | 464/111 |
| 4,540,384 | 9/1985 | Bennett et al. | 464/111 |
| 4,936,811 | 6/1990 | Baker | 464/175 |

FOREIGN PATENT DOCUMENTS

| | | |
|---|---|---|
| 2230895 | 12/1974 | France . |
| 2327372 | 12/1973 | Germany . |
| 2927648 | 1/1981 | Germany . |

*Primary Examiner*—Daniel P. Stodola
*Assistant Examiner*—Eileen A. Dunn
*Attorney, Agent, or Firm*—Harness, Dickey & Pierce

[57] ABSTRACT

An axially fixed transmission joint (10) has a first element (16) which is connected to a first shaft (12) and carries articulation elements (22) of the transmission joint (10) which interact with complementary bearing tracks (24) formed in a second element (18) of the transmission joint (10) which is connected to a second shaft (14). The transmission joint (10) further has an axial stop member (32) connected to the first element (16) which interacts with a complementary spherical stop surface (52) formed in a sealing boot (54) of the transmission joint (10) for immobilizing the first element (16) axially in relation to the second element (18) in at least one direction of relative axial displacement. The sealing boot (54) has a first end (58) which is fastened to the second element (18) and a second end (62) which is fastened to the first shaft (12).

6 Claims, 1 Drawing Sheet

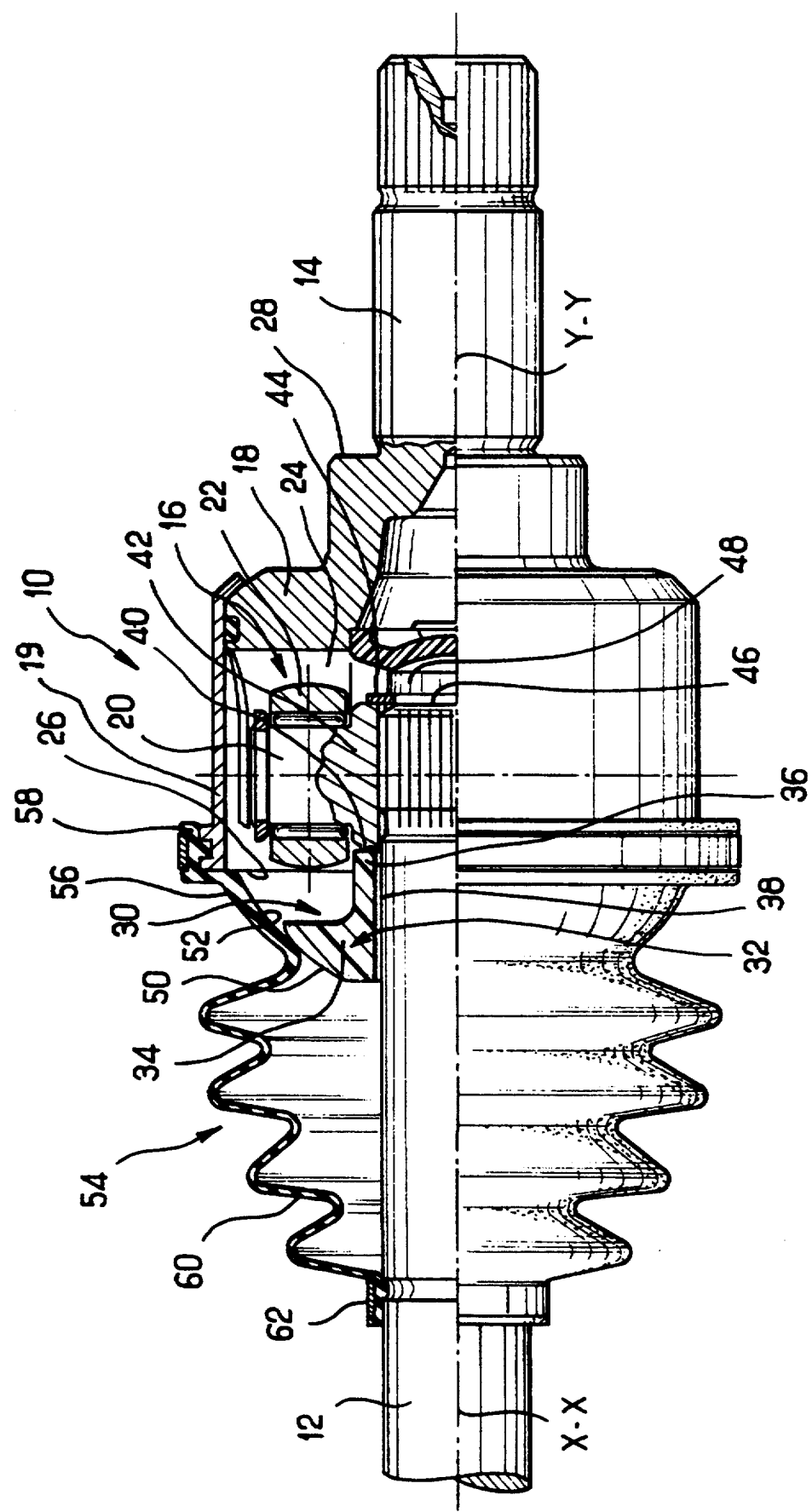

AXIALLY FIXED TRANSMISSION JOINT

This is a continuation of U.S. patent application Ser. No. 806,153, filed Dec. 12, 1991, now abandoned.

The present invention relates to a transmission joint of the axially fixed type.

The invention is concerned more particularly with a transmission joint, in which a first element, such as a tripod, is connected to a first shaft and carries articulation elements of the transmission joint, such as rollers, which interact with complementary bearing tracks formed in a second element of the transmission joint, such as barrel or a socket, connected to a second shaft and of the type comprising means for immobilising the first element axially in relation to the second element in at least one direction.

There are many known embodiments of an axially fixed transmission joint of this type, in which the means for immobilising the first element axially in relation to the second element are of complex structure and costly to produce and sometimes require complicated operations for assembling the transmission joint.

To overcome these disadvantages, the present invention provides a transmission joint of the abovementioned type, characterised in that the means for axial immobilisation comprise an axial stop member connected to the first element of the transmission joint and interacting with a complementary stop surface formed in a sealing boot of the transmission joint, a first end of which is fastened to the second element and the second end of which is fastened to the first shaft.

According to other characteristics of the invention:

the stop member is a cup having a profile of revolution, the convex outer surface of which interacts with a complementary concave stop surface of the sealing boot;

the profile of revolution is a portion of spherical profile;

the cup comprises a central tubular fastening core which is mounted on the first shaft;

the stop surface is formed in a portion of the boot arranged in the vicinity of means for fastening the first end of the boot;

the boot is produced from a thermoplastic material;

the joint is a homokinetic tripod joint.

Other characteristics and advantages of the invention will emerge from a reading of the following detailed description, for an understanding of which reference will be made to the accompanying drawing, the single figure of which is a view in axial section of an exemplary embodiment of a transmission joint produced according to the teachings of the invention.

The figure shows a transmission joint 10 which makes it possible to connect a first transmission shaft 12 and a second transmission shaft 14 to one another.

The joint 10 is shown in the aligned position, that is to say the position in which the axes X—X and Y—Y of the shafts 12 and 14 coincide with one another.

The transmission joint 10 comprises a first element or tripod 16 which is received in a barrel-shaped second element 18.

According to a known structure, the tripod 16 comprises three arms 20 which are distributed uniformly about the axis X-X and each of which receives a rotatably mounted roller 22.

Each roller 22 interacts with a pair of parallel rolling tracks 24 formed in the barrel or socket 18.

The barrel 18 comprises an open axial end 26, which makes it possible to introduce the tripod 16, and a closed opposite axial end 28, to which the second shaft 14 is fastened the barrel 18 is surrounded by a casing 19.

To prevent any relative axial displacement of the shafts 12 and 14 in relation to one another in the direction corresponding to their movement away from one another, and according to the teachings of the invention, means for axial retention 30 are provided.

The means for axial retention 30 comprise an axial stop member 32.

The axial stop member 32 comprises a cup-shaped first part 34 which is extended at its centre by a tubular second part 36 produced integrally with the first part 34.

In the embodiment illustrated in the figure, the axial stop member is an article of revolution produced from plastic.

The tubular part 36 is mounted on a portion 38 of corresponding diameter of the first shaft 12. It is immobilised axially in relation to the shaft 12 as result of the interaction of its radial annular end face 40 against the corresponding face of the central hub 42 of the tripod. The central hub 42 in turn bears axially against the elastic ring 44 engaged in a groove 46 made at the end 48 of the shaft 12.

The cup 34, the axis of revolution of which is parallel to the axis X-X of the first shaft 12, comprises a spherical profile of revolution such that its convex outer surface 50 interacts with a complementary concave stop surface 52 formed in a sealing boot 54 of the transmission joint 10.

The concave spherical stop surface 52 is formed in a first rigid or virtually rigid portion 56 of the boot, the free edge 58 of which constitutes the first end of the boot fastened to the barrel 18.

The other end of the portion 56 is extended by a deformable portion 60 of the boot with accordion folds, the free axial end of which constitutes the second end 62 of the boot 54 fastened to the first shaft 12.

The interaction of the convex 50 and concave 52 surfaces constitutes a spherical knuckle, the function of which is to immobilise the shaft 12 axially, towards the left as seen in the figure, in relation to the shaft 14, whilst at the same time allowing the transmission joint to be set at an angle.

The rigid portion 56 of the boot 54 can be produced integrally with the latter, especially when it is made from a thermoplastic material.

As an alternative (not shown), it is also possible to give the part 56 sufficient rigidity by any other means, such as the insertion of reinforcing elements during the production of the sealing boot by moulding.

The invention just described is not limited to the embodiment illustrated in the figure and can be used for all types of axially fixed transmission joints.

We claim:

1. An axially fixed transmission joint (10) comprising:
   a first element (16) connected to a first shaft (12), said first element (16) carrying a plurality of articulation elements (22) of said transmission joint (10);
   a second element (18) connected to a second shaft (14), said second element (18) having an open end located opposite to said second shaft (14) and a plurality of bearing tracks (24) formed in said second element (18), each of said plurality of articulation elements (22) interacting with a complementary bearing track (24); and means immobilizing said first element (16) axially in relation to said second element (18), said immobilizing means comprising:
an axial stop member (32) connected to said first element (16);
a sealing boot (54) having a first end portion (58) fastened to said open end of said second element (18) and a second end portion (62) fastened to said first shaft (12), said sealing boot (54) further having a stop surface (52) formed in a generally rigid portion (56) of said boot (54), said rigid portion (56) extending from said first end portion of said boot (54) and beyond said second element, said boot (54) further having a deformable convoluted bellows-shaped portion (60) extending between said rigid portion (56) and said second end portion (62), said axial stop member (32) interacting with said stop surface (52) to immobilize axial displacement of said first element (16) in relation to said second element (18) in at least one direction of relative axial displacement, said generally rigid portion (56) and said deformable convoluted portion 60) being integrally molded as one piece.

2. The transmission joint according to claim 1 wherein said first end of said boot (54) has means for fastening said first end (58) of said boot (54) to said second element (18), said stop surface (52) of said boot (54) being formed in the vicinity of said means for fastening said first end of said boot (54).

3. An axially fixed transmission joint (10) comprising:
a fixed element (16) connected to a first shaft (12), said first element (16) carrying a plurality of articulation elements (22) of said transmission joint (10);
a second element (18) connected to a second shaft (14), said second element (18) having an open end located opposite to said second shaft (14) and a plurality of bearing tracks (24) formed in said second element (10), each of said plurality of articulation elements (22) interacting with a complementary bearing track (24); and
means immobilizing said first element (16) axially in relation to said second element (18), said immobilizing means comprising:
an axial stop member (32) connected to said first element (16);
a sealing boot (54) having a first end portion (58) fastened to said open end of said second element (18) and a second end portion (62) fastened to said first shaft (12), said sealing boot (54) further having a stop surface (52) formed in a generally rigid portion (56) of said boot (54), said rigid portion (56) extending from said first end portion of said boot (54) and beyond said second element, said boot (54) further having a deformable convoluted bellows-shaped portion (60) extending between said rigid portion (56) and said second end portion (62), said axial stop member (32) interacting with said stop surface (52) to immobilize axial displacement of said first element (16) in relation to said second element (18) in at least one direction of relative axial displacement, said generally rigid portion (56) and said deformable convoluted portion (60) being integrally molded as one piece, wherein said stop member (32) is a cup (34) having a convex outer surface (50) and said stop surface (52) of said sealing boot (54) has a complementary concave inner surface, said convex outer surface (50) interacting with said concave inner surface.

4. The transmission joint according to claim 3 wherein said convex outer surface (50) is a portion of a spherical profile.

5. The transmission joint according to claim 3 wherein said cup (34) comprises a central tubular fastening core (36) which is mounted on said first shaft (12).

6. An axially fixed transmission joint (10) comprising:
a first element (16) connected to a first shaft (12), said first element (16) carrying a plurality of articulation elements (22) of said transmission joint (10);
a second element (18) connected to a second shaft (14), said second element (18) having an open end located opposite to said second shaft (14) and a plurality of bearing tracks (24) formed in said second element (18), each of said plurality of articulation elements (22) interacting with a complementary bearing track (24); and
means immobilizing said first element (16) axially in relation to said second element (18), said immobilizing means comprising:
an axial stop member (32) connected to said first element (16);
a sealing boot (54) having a first end portion (58) fastened to said open end of said second element (18) and a second end portion (62) fastened to said first shaft (12), said sealing boot (54) further having a stop surface (52) formed in a generally rigid position (56) of said boot (54), said rigid portion (56) extending from said first end portion of said boot (54) and beyond said second element, said boot (54) further having a deformable convoluted bellows-shaped portion extending between said rigid portion (56) and said second end portion (62), said axial stop member (32) interacting with said stop surface (52) to immobilize axial displacement of said first element (16) in relation to said second element (18) in at least one direction of relative axial displacement, said generally rigid portion (56) and said deformable convoluted portion being integrally molded as one piece, wherein said boot (54) is produced from a thermoplastic material.

* * * * *

UNITED STATES PATENT AND TRADEMARK OFFICE
CERTIFICATE OF CORRECTION

PATENT NO.    : 5,451,186
DATED         : September 19, 1995
INVENTOR(S)   : Bernard Poulin and Michel Margerie It is certified that error appears in the above-indentified patent and that said Letters Patent is hereby corrected as shown below:

Column 3, line 22, "60)" should be --(60)--

Column 3, line 31, Claim 3, "fixed" should be --first--

Column 3, line 38, Claim 3, "(10)" should be --(18)--

Column 4, line 1, Claim 3, "62)" should be --(62)--

Column 4, line 52, Claim 6, after "portion", insert --(60)--

Signed and Sealed this

Nineteenth Day of March, 1996

Attest:

BRUCE LEHMAN

Attesting Officer    Commissioner of Patents and Trademarks